FLEXIBLE PRINTED CIRCUIT CABLE CONNECTOR

Filed June 30, 1961

John S. Strobel
INVENTOR
Robert O. Richardson
ATTORNEY

United States Patent Office 3,214,713

Patented Oct. 26, 1965

3,214,713
FLEXIBLE PRINTED CIRCUIT CABLE CONNECTOR

John S. Strobel, Nashua, N.H., assignor to Sanders Associates, Inc., Nashua, N.H., a corporation of Delaware Filed June 30, 1961, Ser. No. 121,013
1 Claim. (Cl. 339—97)

This invention relates to the provision of a flexible printed circuit connector which affords rapid accurate assembly, a mechanical support for soldered joints, and joints isolated from stresses applied to either connector or cable while simultaneously affording a dust cover which may be designed to afford a hermetic seal.

A long standing problem in flexible printed circuit connector structures of the type involved here has been the difficulty in adapting flexible printed circuit cabling to existing connector structures. In these last noted adaptations the flexible printed circuit cable was usually supported only by solder joints which were elevated from the surface of the conductor which resulted in a connection that was inherently weak and readily damaged in ordinary usage.

The flexible printed circuit connector comprising the present invention affords a mechanical support for the soldered joints and in one embodiment is comprised of a connector base containing a plurality of connector terminals embedded therein and protruding from either end of the connector base. The protruding conductor terminals at one end of the conductor base are adapted to engage a female connector socket. The other protruding connector terminals are in piercing engagement with an end section of the flexible printed circuit cabling to be supported. The piercing portions of the connector terminals are in turn bound by a solder connection to the printed circuitry. A ball type snap connector is centrally disposed at the flexible cable side of the connector base and passes through an opening in the printed circuit cable. A cap or dust cover with a centrally disposed ball socket engages the ball snap connector of the connector base and in doing so mechanically sandwiches the flexible printed circuit cabling and soldered connections between the cap and the conductor base, thereby isolating the soldered joints from stresses applied to either connector base or cable while simultaneously affording a dust cover.

In the embodiment disclosed there is incorporated a cable guide in the form of a circular disk which is mounted between the cap and the cable and which has a cable guide element at its periphery which holds the cable at right angles to the soldered joint area and parallel to the central axis of the base connector.

Therefore, an object of this invention is to provide a flexible printed circuit cable connector which isolates the cable's soldered joints from stresses applied to either the cable or its connector base.

Another object of this invention is to provide a snap on dust cover to flexible circuit cable connector.

Still another object of this invention is to provide a connector guide for a flexible printed circuit cable connector which will hold the cable parallel to the conductor base's central axis and which will afford stress relief for the connectors soldered joints while simultaneously protecting the flexible printed circuit cable at its right angle entry into the connector unit.

Other objects of my invention will in part be obvious and will in part appear hereafter.

The invention accordingly comprises the features of construction, combination of elements and arrangement of parts which will be exemplified in the construction hereinafter set forth and the scope of the invention will be indicated in the claim.

For a fuller understanding of the preferred embodiment of this invention, reference is now had to the drawings wherein.

Figures 1, 2, 3:
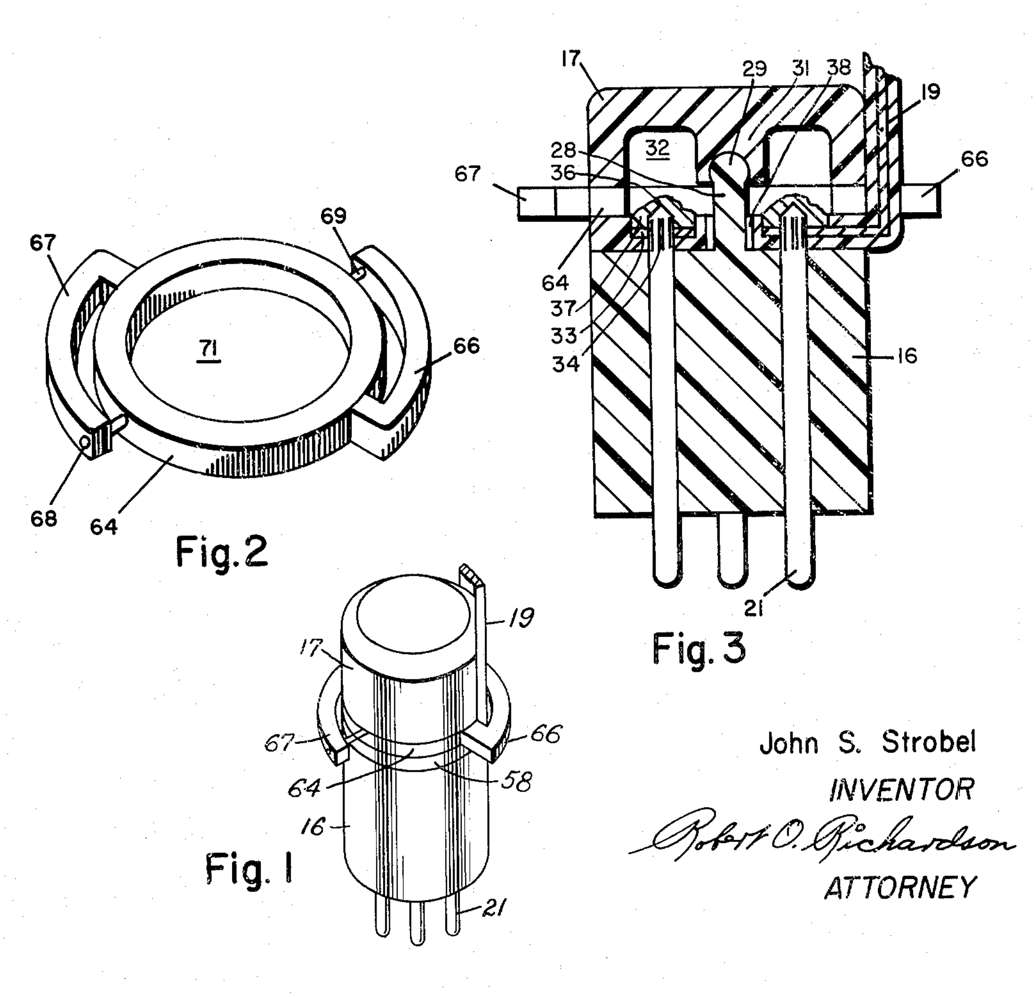
FIGURE 1 illustrates in perspective a finished male connector assembly utilizing a guide disk to hold the flexible printed circuit cable parallel to the connector's central axis.
FIGURE 2 is a perspective view of a typical cable guide element for the connector of FIG. 3.
FIGURE 3 is a sectional view of a male connector and cap of FIG. 1 utilizing a cable guide.

Referring now to FIGURES 1 and 3, which is a cross section taken of FIGURE 1, there will be noted base connector 16 with male conductor elements 21 embedded in the base connector 16 and protruding from the base of said connector through the upper surface of the base connector 16 and passing through in a piercing manner the flexible printed circuit cable 19. The piercing portion of the terminals 21 are grooved at 34 in order that these piercing portions grasp for the purposes of lateral stability the flexible printed circuit cable 19. It will be noted that in the central portion of the base connector 16, there is an upright element 28 with a ball-shaped portion 29 integral with the upraised portion 28. Covering the entire flexible printed circuit that covers the conductor base 16 is a dust cover or cap 17 which has disposed at its center a downwardly projecting portion 31 which has formed therein a socket in which is received the ball portion 29 of the base connector. It should be noted that the ball and socket 29, 31 is designed in a manner that will provide a snap connection between the cover 17 and the base 16. It will be noted that where the terminals 14 pierce the flexible printed circuit cable 19, the flexible printed circuit conductor 33 is exposed to a solder connection 37 which covers the point of the terminals 21; i.e., point 36, solder 37 when applied in a molten state runs down along the side of the terminal point 36 and interconnects the printed circuitry copper 33 to the terminal 36. There will be noted a void area 32 between the cap 17 and the flexible printed cable 19. This void 32 may be filled with a non-rigid potting compound to further aid in the physical structural stability of the overall unit.

Guide disc 64 serves as a means to guide the flexible printed cable from the finished connector in a manner that will permit it to lie parallel to the central axis of the connector. It will be noted that there are guide elements 67 and 66 on the periphery of central ring 64 which has a central opening 71. There are provided in each of the guide elements 66 and 67 removable screws 68 and 69 to thereby enhance the ease of locating the cables between the guide elements 66, 67 and the ring 64. The second cable guide element 67 may be utilized as a guide element if more than one flexible printed end circuit is to be sandwiched between the cap 17 and the cable 19. It is obvious of course that the conductor terminals 21 would have to be of varying lengths in order that a connection be made to a second cable end section if more than one end cable were utilized.

Figure 4:
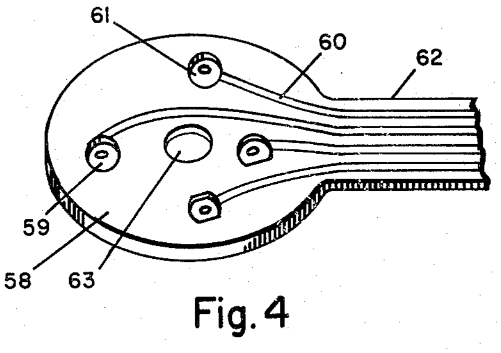
FIGURE 4 is a perspective view of a typical flexible printed circuit cable connector end portion.

FIGURE 4 shows typical flexible printed circuit cable end section of the type used in FIGURE 1 and FIGURE 3 and designated therein as 19. It will be noted that the end portion 58 of printed cable 62 is circular in shape in order that it match the configuration of the base connector portion. Disposed in the center thereof, is the opening 63 which is needed in those applications such as that shown in FIGURE 3 where a ball-and-socket arrangement is used. In this type of application a stem section 28 which carries a ball 29 as shown in FIGURE 3, passes through the hole 63. The cable end section is typical in that it discloses four exposed conductors two of which are designated 61 and 59. It is to be understood that this invention is not limited to any specific number of conductors. The number of exposed conductor portions for example 61, 59 is a matter of design to be selected by those applications that present themselves to this invention. It will be noted that there are a plurality of copper flexible elements 60 embedded in the cable 62, which lead to typical bared conductor surfaces such as 61 and 59 recessed in the surface of end pad 58.

While there have been described what are at present considered to be the preferred embodiments of this invention, it will be obvious to those skilled in the art that there are changes and modifications that may be made therein without departing from the invention, and it is, therefore, intended in the appended claim to cover all such changes and modifications as fall within the true spirit and scope of the invention.

What is claimed is:

A terminal connection comprised of
a cover means,
said cover means having a top portion and downwardly projecting side portions integral with said top portion at the periphery of said top portion,
a base connector, and
flexible printed circuit cable means,
said base connector having a top side and a bottom side,
said base connector having a plurality of conductor terminals embedded therein and protruding from said top side and said bottom side,
said flexible printed circuit cable having an end portion interposed between said cover means and said top side of said base connector, said conductor terminals protruding from said top side of said connector and being in mating engagement with said end portion of said flexible printed circuit cable, thereby forming a conductor terminal connection to said end portion of said flexible printed circuit cable,
guide means,
said guide means interposed between said flexible printed circuit end portion and said cover means,
said guide means being comprised of a disk shaped element having a central opening,
said guide means having at least one guide element disposed at the periphery of said disk shape guide means to thereby control the exit direction of said flexible cable from said terminal connection,
cover connector means,
said cap connector means interconnecting said cover to said base connector to thereby afford a protective covering for said conductor terminal connection.

References Cited by the Examiner

UNITED STATES PATENTS

| | | | |
|---|---|---|---|
| 2,066,511 | 1/37 | Arlt | 339—17 |
| 2,121,063 | 6/38 | Walter | 339—99 |
| 2,440,748 | 5/48 | Johnson | 339—99 |
| 2,946,877 | 7/60 | Nalette et al. | 339—17 X |
| 3,027,417 | 3/62 | Turner | 339—103 X |
| 3,059,211 | 10/62 | Thomas et al. | 339—94 X |
| 3,088,090 | 4/63 | Cole et al. | 339—94 X |

JOSEPH D. SEERS, *Primary Examiner.*

ALBERT H. KAMPE, ALFRED S. TRASK, *Examiners.*